US005201943A

United States Patent [19]

Monnerat

[11] Patent Number: 5,201,943

[45] Date of Patent: Apr. 13, 1993

[54] PROCESS FOR RECYCLING AND REFURBISHMENT OF WATER-WIPE INTAGLIO INKS USED IN WATER WIPE INTAGLIO PRINTING

[76] Inventor: Andre R. L. Monnerat, Chemin de la Golliesse, Lutry, Switzerland, CH-1095

[21] Appl. No.: 802,045

[22] Filed: Dec. 3, 1991

Related U.S. Application Data

[63] Continuation-in-part of Ser. No. 100,067 filed as PCT/CH1/00067 Mar. 20, 1991.

[30] Foreign Application Priority Data

Apr. 18, 1990 [CH] Switzerland ........................ 1289/90

[51] Int. Cl.[5] ........................ C09D 11/02

[52] U.S. Cl. ........................ 106/20 A; 210/724; 210/725; 210/652

[58] Field of Search ........................ 106/20; 210/724, 725, 210/652

[56] References Cited

U.S. PATENT DOCUMENTS

| | | | |
|---|---|---|---|
| 3,468,248 | 9/1969 | Giori | 101/167 |
| 3,502,577 | 3/1970 | Hutchins et al. | 210/702 |
| 4,000,065 | 12/1976 | Ladha et al. | 210/265 |
| 4,165,288 | 8/1979 | Teed et al. | 210/265 |
| 4,391,638 | 7/1983 | Fusco et al. | 106/20 |
| 4,565,638 | 1/1986 | Zucker | 106/20 |
| 5,017,291 | 5/1991 | Semler et al. | 210/265 |

FOREIGN PATENT DOCUMENTS

| | | |
|---|---|---|
| 043624 | 6/1981 | European Pat. Off. . |
| 2594131 | 2/1986 | France . |

*Primary Examiner*—Mark L. Bell
*Assistant Examiner*—Helene Klemanski
*Attorney, Agent, or Firm*—Bacon & Thomas

[57] ABSTRACT

A process is disclosed in which ink contained in a water-wipe solution used in the intaglio printing of security documents is recycled after being refurbished. The water-wipe solution is neutralized; the ink is separated by filtration and refurbished before being utilized.

44 Claims, No Drawings

PROCESS FOR RECYCLING AND REFURBISHMENT OF WATER-WIPE INTAGLIO INKS USED IN WATER WIPE INTAGLIO PRINTING

CROSS-REFERENCE TO RELATED APPLICATIONS

The present application is a continuation-in-part application of copending PCT application PCT/CH91/00067, filed on Mar. 20, 1991.

TECHNICAL FIELD

The field of art pertaining to this invention is printing inks and, more specifically, the process of recycling and refurbishment of water-wipe intaglio inks.

BACKGROUND ART

Intaglio inks and water-wipe intaglio printing processes are well-known in the art.

Typically, intaglio printing refers to a printing method using a plate that contains engraved areas which transfers the contained ink to the surface of a substrate, thereby forming the printed image. The plates may be engraved by machine, by hand or by a chemical etching process. The intaglio process may be either a sheet-fed or a web-fed process.

Security documents are mostly printed with an intaglio process using curved intaglio plates on sheet-fed presses. Security documents include banknotes, stamps, certificates, fine-line documents and similar printed substrates. The images are primarily line images and the inks used are of a high-viscosity type. Nowadays, water-wipe intaglio and paper-wipe intaglio processes are the two most widely used printing methods. For a water-wipe intaglio printing process, an engraved plate is inked by an inking roller system which presses ink into the engravings. The excessive ink surrounding the various engravings is then wiped by a wiping roller system which comprises a clean vinyl or rubber roller. The wiping roller contacts the engraved plate and wipes the excessive ink away from the non-image areas in a continuous manner. Prior to re-contacting the intaglio plate, the wiping roller is brushed with a water-wipe solution to emulsify the ink for the removal of the ink. The inked and wiped plate is brought into contact with a substrate. Under high pressure, the printing is thus done with the transferring of ink from engraved plate to the substrate. The printed substrates are removed from the press and dried. The printing process is then repeated. The wiping solution may contain an organic solvent (e.g., trichloroethylene) which is usually not used for hazardous reasons. The water-wipe solution may contain up to 1% by weight sodium hydroxide and up to 1% by weight sulfonated castor oil and/or surfactant (e.g., Teepol).

During this printing process, 80% to 90% of the water-wipe intaglio ink carried to the plate cylinder is wasted and wiped to the wiping solution. Only 10% to 20% of the ink forms the printed image. Thus, it is necessary to separate the wasted intaglio ink from the wiping solution which is an expensive process. For the wiping solution that contains organic solvent, this separation can be done by distillation. Usually, the treatment for the water-wipe solution is to add to the solution some iron chloride, or diatomaceous earth, etc. Processes of filtration and neutralization of the aqueous phase are then followed. The wasted intaglio ink is treated as solid waste and is not reused. This kind of waste must be incinerated, which is expensive and generates hazardous solids and fumes.

The object of this invention is to reduce the hazardous waste and to enhance the efficiency of intaglio ink consumption with the aid of recycling and refurbishment of the wasted intaglio ink from the water-wipe solution.

Other processes invented to try to reduce the consumption of intaglio inks are disclosed in French Patent Number 1,564,653, referring to the principle of wet offset balance between water and ink on the plate, and Swiss Patent Number 628,289, suggesting the installation of an anti-adherence layer to counter inkings on the non-image areas on the plate and U.S. Pat. No. 4,391,638 proposes a method for reclaiming waste offset ink for disposal purposes. Some printers try to collect ink by using a pre-wiping cylinder, but the collected ink has often been polymerized, leading to a degraded ink quality. None of these processes conserve the consumption of intaglio ink by recycling the wasted intaglio ink extracted from the water-wipe solution.

Conventional intaglio inks used in the art are dried or cured by oxidation. This type of ink contains oleoresinous or alkyd resin-type associated with driers. The oleoresinous may be a linseed oil or solid resin such as phenolic resin or maleic resin soluble in a mineral oil (boiling point: 160° C. to 330° C.) or unsaturated oil or in a polyol. The ink contains some fillers such as calcium carbonate or barium sulfate associated with inorganic or organic pigments. Another type of intaglio inks are Electron Beam (EB) inks cured by radiation mechanism. The EB intaglio inks contain acrylic polymers or oligomers or monomers as varnishes. The intaglio inks must be able to be wiped from the wiping cylinder in a water solution containing up to 1% by weight caustic soda and up to 1% by weight sulfonated castor oil. This water-wipe solution is, in fact, alkaline. However, it is possible that in some instances an acid water-wipe solution may be employed.

Usually, the water-wipe solution containing the wasted intaglio ink cannot be directly filtrated because of the viscosity of the waste. Thus, to stabilize the flocculation, the solution is treated by adding some iron chloride or diatomaceous earth so that the wasted intaglio ink can be removed by filtration. However, this destroys the ink so that it cannot be reused. Thus, there is a long-felt need in the art for separating the ink from the water-wipe solution so that the ink is not destroyed and so that the ink can be reused or recycled.

DISCLOSURE OF THE INVENTION

The objective of the invention is achieved by chemically treating the water-wipe solution which contains the ink dispersed therein so that the ink can be efficiently separated or recovered from the water-wipe solution for reuse without destruction of the ink. The chemical treatment comprises neutralizing the mixture which contains ink dispersed in the water-wipe solution. This neutralization allows the ink to be easily separated and recovered for reuse. Thus, the essence of the invention is to stabilize the water-wipe/ink mixture by means of chemical neutralization immediately after the wiping process so that the mixture (emulsion or flocculated ink/water dispersion) can be efficiently subjected to a conventional separation procedure for recovery of the ink. The neutralization must be made to have a pH value of preferably 5 to 9, more preferably 6 to 8, most preferably 6.5 to 7.5 with acids (e.g., nitric acid, fumaric acid, etc.) or alkalines (e.g., sodium hydroxide, ammonia) or buffer solutions (e.g., borax, tartrate). Thus, an alkaline water-wipe solution may be neutralized to the desired pH range by adding an acid thereto. Likewise, an acid water-wipe solution may be neutralized to the desired pH range by the addition of an alkaline material. In a pure water-wipe solution, the neutralization is not necessary since the pH of pure water is 7, but the addition of an ionic or nonionic surfactant up to 15% by weight is sufficient to stabilize flocculation. In some instances, it is not necessary to add the surfactant. Thus, in one embodiment, 0% to 15% by weight surfactant may be added. Preferably, surfactant is added in an amount of up to 5% by weight.

In view of the above, one skilled in the art will readily recognize that the central feature of the invention resides in mixing the wasted ink in a water solution, particularly an alkaline water solution, and then neutralizing the ink/water mixture so that the ink can be separated from the water without destruction of the ink. Thus, the method used to remove the wasted ink or excess ink from the engraved plate is immaterial to the central feature of the invention. In other words, the wasted ink need not be limited to the wasted ink which is removed from the engraved plate by means of the wiping roller which has been wet with the wiping solution. In fact, any wasted ink, regardless of the method used to remove it from the plate, may be recovered for reuse by collecting it and immediately mixing it with the water-wipe solution and then treating the mixture in accordance with the procedure described herein. Thus, in a broad sense, the invention is directed to mixing the wasted or excess ink with the water-wipe solution and then neutralizing it to the desired pH range or, in the case of a neutral water-wipe solution (substantially pure water-wipe solution), adding surfactant to the solution, so that the ink can be separated from the solution without any deleterious changes occurring to the ink.

The second step is to recover the ink from the water-wipe solution by conventional separation techniques. For example, the solution may be subjected to filtration in a rotating or press filter or other type of filter. Any conventional separation apparatus and method may be used including decantation, ultracentrifugation and reverse osmosis to separate the solid phase (wasted intaglio ink) from the aqueous phase. It is important to preserve an amount of 1% to 50% by weight (preferably 1% to 45%) of water in the separated ink. Preferably, such refurbished intaglio ink contains 5% to 30% by weight, preferably 5% to 25% by weight water for oxidative inks and up to 10% by weight water in EB inks. The refurbished EB inks may preferably contain 1% to 5% by weight water. In some instances, the ink may be recovered from the ink/water-wipe solution before neutralization. In those instances, the recovered ink having the desired amount of water contained therein is neutralized by adding an acid, base or buffer thereto in the same manner as noted above with respect to the ink/water-wipe solution.

It will be also be readily recognized that the percentage of ink recovered from the solution may be less than 100% due to imperfections in the separation or filtration process. For example, some of the constituents of the ink (including pigment, resin and other ingredients such as catalytic drier) may not be recovered for reuse from the solution. Thus, the recovered ink may be lacking a portion of the original composition. In some instances, the recovered ink will be suitable for reuse even though a portion of the original composition is lacking. Preferably, the recovered ink is refurbished or regenerated by adding ingredients thereto which were lost. For example, fresh ingredients may be added to the recovered ink to restore it to its original composition. The ingredients may be added to the ink individually or, alternatively, the ingredients may be mixed together to form a composite varnish which is then added to the recovered ink to refurbish or regenerate it. The composite varnish may include the liquid component of the ink. Thus, the third step is to refurbish the ink for reuse in water-wipe intaglio printing. Naturally, the choice of additives used for this step depends on the nature of the original inks. For example, an oxidative ink can be refurbished by adding 1% to 30% by weight (preferably 1% to 20%) by weight of alkyd resin (urethane-type or phenolic-type with tung oil or linseed oil and/or polyethylene glycol, e.g., P400), and 0.5% by weight of oxidative catalytic drier (e.g., manganese octoate). Similarly, the addition of 1% to 10% by weight of epoxy acrylate oligomer and/or monomer (e.g., trimethylolpropane triacrylate) can refurbish an EB ink from the recovered intaglio ink. Preferably, it is further recommended that a composite varnish with 5% to 15% of pigmentation (e.g., 10%) shall be used for refurbishing the wasted intaglio ink in order to restore the composition of the intaglio ink. After mixing and/or grinding, the ink is reused in a water-wipe intaglio printing process.

The finished ink will exhibit an excellent detergeability which leads to good wiping ability during printings. The finished ink also provides printed products with very good (above an acceptable level) chemical and physical resistances. The resistance specifications generally accepted are the "RESOLUTION OF 5th INTERPOL INTERNATIONAL CONFERENCE," declared in 1969, and the "U.S. BUREAU OF ENGRAVING AND PRINTING'S TEST METHODS," instituted in BEP solicitation documents such as BEP-88-214 (TN).

For the industrial application, on-line system containing an automatic neutralization unit and a filtration unit can be installed at the drainage tank of a water-wipe intaglio printing press. After the neutralization and filtration, the separated ink can be refurbished by the procedures described above.

While the invention has been described in connection with one of its preferred embodiments, it should be understood that changes and modifications may be made without departing from the scope of the appended claims.

What is claimed is:

1. A method for recovering wasted intaglio ink which is wasted in an intaglio printing process; said method comprising the steps of:

mixing the wasted ink with an alkaline or acid aqueous solution to form an ink/water mixture;

neutralizing the ink/water mixture to a pH of 5 to 10 with an acid, base or a buffer; and then separating the ink and a portion of the water from the mixture to recover ink having a water content of about 1% to 45% by weight.

2. The method of claim 1 wherein less than 100% of the ink composition is recovered from the mixture and the method further comprises the step of regenerating the recovered ink by adding ingredients to the recovered ink; said ingredients corresponding to the unrecovered ingredients.

3. The method of claim 1 wherein the pH is 5 to 9.

4. The method of claim 1 wherein the aqueous solution is alkaline and the pH is adjusted by adding an acid thereto.

5. The method of claim 3 wherein the pH is 6 to 8.

6. The method of claim 5 wherein the pH is 6.5 to 7.5.

7. The method of claim 3 wherein the intaglio ink is an oxidative ink and the water content of the recovered ink is 5% to 30% by weight.

8. The method of claim 7 wherein the water content of the recovered ink is 5% to 25% by weight.

9. The method of claim 8 which further includes the step of regenerating the resin content of the recovered ink by adding resin to said recovered ink.

10. The method of claim 9 wherein the resin content of the recovered ink is regenerated by adding 1% to 30% by weight of resin to the recovered ink.

11. The method of claim 10 wherein the amount of added resin is 1% to 20% by weight.

12. The method of claim 11 which further includes the step of adding pigment to the recovered ink in an amount to restore the pigmentation level of the ink.

13. The method of claim 3 wherein the intaglio ink is an electron beam curable ink and the water content of the recovered ink is up to 10% by weight.

14. The method of claim 13 which further includes the step of refurbishing the recovered ink by adding 1% to 10% by weight of epoxy acrylate oligomer to the recovered ink.

15. The method of claim 13 which further includes the step of refurbishing the recovered ink by adding trimethylolpropane triacrylate monomer to the recovered ink.

16. A method for recovering wasted intaglio ink which is wasted in an intaglio printing process; said method comprising the steps of:

mixing the wasted ink with an alkaline or acid aqueous solution to form an ink/water mixture;

neutralizing the ink/water mixture to a pH of 5 to 10 with an acid, base or a buffer; and then separating the ink and a portion of the water from the mixture to recover ink having a water content of 1% to 50% by weight.

17. A method for recovering wasted intaglio ink which is wasted in an intaglio printing process; said method comprising the steps of:

mixing the wasted ink with water having a neutral pH to form a water/ink mixture;

adding up to 15% by weight of an ionic or nonionic surfactant to the mixture; and then separating the ink and a portion of the water from the mixture to recover ink having a water content of 1% to 50% by weight.

18. The method of claim 17 wherein the water content of the recovered ink is 1% to 45% by weight.

19. A method for recovering intaglio ink which has become mixed with a water-wipe solution during an intaglio printing process; said method comprising the steps of:

wiping excessive intaglio ink from the surface of a device used in an intaglio printing process wherein said ink is wiped with an alkaline water-wipe solution to form a mixture containing ink and water;

adjusting the pH of the mixture to a value of 5 to 9; and separating the ink and a portion of the water from the mixture to recover ink having a water content of about 1% to 45% by weight.

20. The method of claim 19 wherein the intaglio ink is oxidative ink and the water content of the recovered ink is 5% to 25% by weight.

21. The method of claim 20 which further includes the step of refurbishing the recovered ink by adding 1% to 30% by weight resin to the recovered ink.

22. The method of claim 21 wherein the refurbishing of the ink includes adding oxidative catalytic drier to the recovered ink.

23. The method of claim 21 wherein the step of refurbishing the ink includes adding pigment to the recovered ink in an amount to restore the pigmentation level of the ink.

24. The method of claim 23 wherein the pigment is in the form of a varnish having 5% to 15% pigmentation by weight.

25. The method of claim 22 wherein the oxidative catalytic drier is added in an amount of about 0.5% by weight.

26. The method of claim 25 wherein the oxidative catalytic drier is manganese octoate.

27. The method of claim 19 wherein the water-wipe solution contains up to 1.0% by weight of caustic soda and up to 1% by weight of sulfonated castor oil.

28. The method of claim 19 wherein the intaglio ink is an electron beam curable ink and the water content of the recovered ink is up to 10% by weight.

29. The method of claim 28 which further includes the step of refurbishing the recovered ink by adding 1% to 10% by weight of epoxy acrylate oligomer monomer to the recovered ink.

30. The method of claim 29 wherein the monomer is trimethylolpropane triacrylate.

31. The method of claim 19 wherein the pH is adjusted to a value of 6.5 to 7.5.

32. The method of claim 29 wherein the step of refurbishing the ink includes adding pigment to the recovered ink in an amount to restore the pigmentation level of the ink.

33. The method of claim 32 wherein the pigment is in the form of a varnish having 5% to 15% pigmentation by weight.

34. The method of claim 19 wherein the separation of the ink and a portion of the water from the mixture is conducted by a method selected from the group consisting of filtration, decantation, ultracentrifugation and reverse osmosis.

35. A method for recovering intaglio ink which has become mixed with a water-wipe solution during an intaglio printing process; said method comprising the steps of:

wiping excessive intaglio ink from the surface of a device used in an intaglio printing process wherein said ink is wiped with a water-wipe solution having a neutral pH to form a mixture containing ink and water;

adding up to 15% by weight of an ionic or nonionic surfactant to the mixture; and separating the ink and a portion of the water from the mixture to recover ink having a water content of about 1% to 45% by weight.

36. A method for recovering intaglio ink which has become mixed with a water-wipe solution during an intaglio printing process; said method comprising the steps of:

wiping excessive intaglio ink from the surface of a device used in acid intaglio printing process wherein said ink is wiped with an alkaline water-wipe solution to form a mixture containing ink and water;

adjusting the pH of the mixture to a value of 5 to 10; and separating the ink and a portion of the water from the mixture to recover ink having a water content of about 1% to 50% by weight.

37. The method of claim 18 wherein the intaglio ink is oxidative ink and the water content of the recovered ink is 5% to 30% by weight.

38. The method of claim 37 which further includes the steps of refurbishing the recovered ink by adding 1% to 30% by weight of resin to the recovered ink.

39. The method of claim 36 wherein the pH is adjusted to a value of 6 to 8.

40. A method for recovering wasted intaglio ink which is wasted in an intaglio printing process; said method comprising the steps of mixing the wasted ink with water having a neutral pH to form a water/ink mixture and then separating the ink and a portion of the water from the mixture to recover ink having a water content of 1% to 50% by weight.

41. A method for recovering wasted intaglio ink which is wasted in an intaglio printing process; said method comprising the steps of:

mixing the wasted ink with an alkaline or acid aqueous solution to form an ink/water mixture;

separating the ink and a portion of the water from the mixture to recover ink having a water content of about 1% to 50% by weight; and then neutralizing the recovered ink having said water content of 1% to 50% by weight with an acid, base or buffer to produce a pH of 5 to 10.

42. The method of claim 41 wherein the separated ink having a portion of water contained therein is alkaline and the neutralization is performed with an acid.

43. The method of claim 42 wherein the pH is 5 to 9.

44. The method of claim 43 wherein the water content of the recovered ink is about 1% to 45% by weight.

* * * * *